US012558745B2

(12) United States Patent
Ishizaki et al.

(10) Patent No.: US 12,558,745 B2
(45) Date of Patent: Feb. 24, 2026

(54) FLUX FOR ELECTROSLAG WELDING AND ELECTROSLAG WELDING METHOD

(71) Applicant: Kobe Steel, Ltd., Kobe (JP)

(72) Inventors: Keito Ishizaki, Kanagawa (JP);
Yoshihiko Kitagawa, Kanagawa (JP);
Tomoko Sugimura, Hyogo (JP);
Tatsuya Sasaki, Hyogo (JP); Hidenori Nako, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 703 days.

(21) Appl. No.: 17/905,389

(22) PCT Filed: Feb. 24, 2021

(86) PCT No.: PCT/JP2021/006838
§ 371 (c)(1),
(2) Date: Aug. 31, 2022

(87) PCT Pub. No.: WO2021/177106
PCT Pub. Date: Sep. 10, 2021

(65) Prior Publication Data
US 2023/0111990 A1      Apr. 13, 2023

(30) Foreign Application Priority Data

Mar. 6, 2020    (JP) ................................. 2020-038722

(51) Int. Cl.
*B23K 35/362*        (2006.01)
*B23K 25/00*         (2006.01)
*B23K 35/30*         (2006.01)
(52) U.S. Cl.
CPC ............ *B23K 35/362* (2013.01); *B23K 25/00* (2013.01); *B23K 35/30* (2013.01)

(58) Field of Classification Search
CPC ...... B23K 35/362; B23K 25/00; B23K 35/30; B23K 35/3602; B23K 35/3605
See application file for complete search history.

(56) References Cited

U.S. PATENT DOCUMENTS 4,437,906 A * 3/1984 Tateishi ............. B23K 35/3605
                                                           148/26
2019/0210166 A1 7/2019 Ishizaki et al.

FOREIGN PATENT DOCUMENTS

EP        0 092 621 A2    11/1983
JP        53-70948 A      6/1978
(Continued)

OTHER PUBLICATIONS

International Search Report and Written Opinion issued May 18, 2021 in PCT/JP2021/006838 (with unedited computer generated English Translation), 17 pages.
(Continued)

*Primary Examiner* — Adil A. Siddiqui
(74) *Attorney, Agent, or Firm* — Oblon, McClelland, Maier & Neustadt, L.L.P.

(57)                    ABSTRACT
A flux for electroslag welding used for electroslag welding may include a basic oxide, an amphoteric oxide, an acidic oxide, and a fluoride. With respect to a total mass of the flux, the basic oxide may include 5.1 mass % or more and 30.0 mass % or less of CaO, the acidic oxide includes 17 mass % or less of $SiO_2$, and the fluoride includes 35 mass % or more and 73 mass % or less of CaF2. A content of the CaO is 30 mass % or more with respect to a total mass of the basic oxide, a content of the $SiO_2$ is 80 mass % or more with respect to a total mass of the acidic oxide, a content of the $CaF_2$ is 80 mass % or more with respect to a total mass of the fluoride, and a value of $(2\times[CaF_2]+[CaO])/[SiO_2]$ is 5 or more and 56 or less.

18 Claims, 1 Drawing Sheet

(56)                    References Cited

FOREIGN PATENT DOCUMENTS

| JP | 60-61195 | A | 4/1985 |
|----|----|----|----|
| JP | 60-111793 | A | 6/1985 |
| JP | 6-285679 | A | 10/1994 |
| JP | 2009-202213 | A | 9/2009 |
| JP | 2010-234395 | A | 10/2010 |
| JP | 2016-215214 | A | 12/2016 |
| JP | 2017-170500 | A | 9/2017 |
| JP | 2018-43288 | A | 3/2018 |
| JP | 2018-75613 | A | 5/2018 |
| KR | 10-0419170 | B1 | 2/2004 |

OTHER PUBLICATIONS

Extended European Search Report Issued Jun. 26, 2023 in European
Application 21764392.3, 11 pages.

* cited by examiner

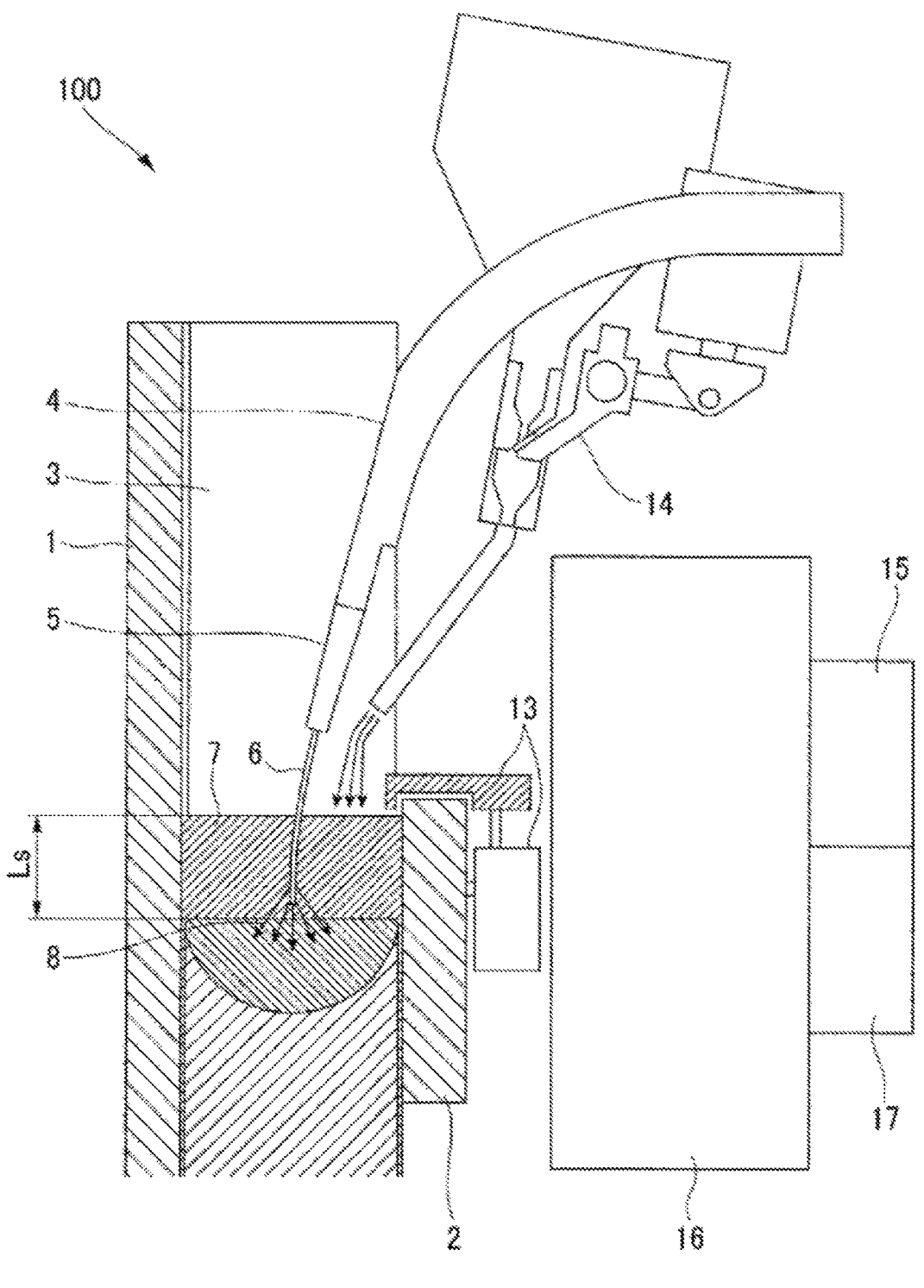

FLUX FOR ELECTROSLAG WELDING AND ELECTROSLAG WELDING METHOD

CROSS-REFERENCE TO RELATED APPLICATIONS

The present application is the national stage of international application PCT/JP2021/006838, filed on Feb. 24, 2021, and claims the benefit of the filing date of Japanese Appl. No. 2020-038722, filed on Mar. 6, 2020.

TECHNICAL FIELD

The present invention relates to a flux for electroslag welding that is used for electroslag welding on a steel material having a tensile strength of 680 MPa or more, particularly 780 MPa or more, and that can be generally applied regardless of the type of steel such as high-tensile steel, 9% Ni steel, and chromium steel.

BACKGROUND ART

In the field of building steel frames, in recent years, there have been increased various demands for increasing the size and complexity of a structure shape, securing a large space, and the like, and a load applied to a box column has been increased. The box column is a structure manufactured by joining a skin plate welded and joined in a square steel pipe shape and a plurality of diaphragms partitioning an internal space of the skin plate by electroslag welding, for example. In order to satisfy the requirement for a high load, it is common to use a high tensile steel plate.

However, in the electroslag welding, since a cooling rate of a weld metal is slow and the strength of the weld metal is likely to decrease due to the characteristic that a welding heat input becomes excessive, it is difficult to obtain the mechanical performance of the weld metal suitable for a high tensile strength steel to be applied. Such a decrease in the mechanical performance occurs not only in a high tensile steel sheet but also in other steel types having a tensile strength of 680 MPa or more, for example, a 9% Ni steel sheet. Particularly, when the tensile strength is 780 MPa or more, the decrease in the mechanical performance becomes remarkable.

In order to solve the above-described problems, Patent Literature 1 discloses a flux-cored wire for electroslag welding for high tensile strength steel, which is used for electroslag welding of 780 MPa grade steel, and contains, by mass % with respect to the total mass of the wire, C: 0.10-0.20%, Si: 0.2-1.0%, Mn: 1.3-2.5%, Cu: 0.1-0.5%, Ni: 1.5-2.5%, Cr: 0.3-0.7%, Mo: 0.3-0.7%, and Ti: 0.15-0.25%, Al: 0.05% or less, a total of F conversion values: 0.01-0.1%, a total of SiO$_2$ conversion values: 0.01-0.2%, and a total of Na$_2$O conversion values and K$_2$O conversion values: 0.02-0.1%. According to Patent Literature 1, a weld metal having no welding defect and stable mechanical performance can be obtained.

Further, Patent Literature 2 directed to 9% Ni steel discloses a wire for electroslag welding, a flux, and a weld joint, which contain, by mass %, C: more than 0% and 0.07% or less, Si: more than 0% and 0.50% or less, Mn: more than 0% to 1.0%, Ni: 6.0-15.0%, and Fe: 79% or more, and satisfy a relationship: "0.150≤C+Si/30+Mn/20+Ni/60≤0.300". According to Patent Literature 2, it is described that a welded joint which has a weld metal having high efficiency with a heat input amount of 10 kJ/mm or more and excellent mechanical properties such as strength and cryogenic characteristics can be obtained.

CITATION LIST

Patent Literature

Patent Literature 1: JP-A-2017-170500
Patent Literature 2: JP-A-2018-43288

SUMMARY OF INVENTION

Technical Problem

As described above, Patent Literature 1 and Patent Literature 2 solve the problem related to the mechanical performance of the weld metal in the case of electroslag welding a steel sheet having a high tensile strength. However, in the electroslag welding using a steel sheet having high tensile strength, the problem is not only mechanical performance. A steel sheet (hereinafter, also referred to as a base metal) or a welding material (hereinafter, also referred to as a welding wire) having high tensile strength contains various specific elements such as C, Mo, Ni, and Cr in order to increase strength. The contents of these elements increase as the tensile strength increases.

Electroslag welding is a type of electric fusion welding method, and is a welding method in which molten slag is generated by melting flux by are heat generated between a welding wire and a base metal immediately after the start of welding. Then, when a layer of molten slag having an appropriate depth (hereinafter, also referred to as a slag bath) is formed, an arc disappears, and the welding wire and the base metal are melted by resistance heat generation of the slag bath, whereby joining can be performed.

Here, when various elements for improving the tensile strength are present in the base metal or the welding wire, a composition of the slag bath is changed by a reaction between elements and the slag bath, and thus physical properties such as viscosity and electrical conductivity of the slag bath are changed. When the physical properties of the slag bath are changed, an arc is generated at the time of welding, which causes welding unstable, welding defects such as undercut, and problems related to appearance such as slag detachability and seizure.

In Patent Literature 1 and Patent Literature 2, the compositions of the welding wire and the flux are adjusted in order to ensure the mechanical performance of the weld metal. However, the problems such as an appearance caused by slag are not taken into consideration. Originally, it is preferable to use a suitable flux depending on a steel type of a base metal or a welding wire to be welded. However, since there are many types of base metal and welding wire and a wide variety of combinations of alloy elements, it is not realistic to use flux suitable for each base metal or welding wire. Therefore, there is a demand for flux that can be generally used regardless of the type of steel sheet or welding wire containing various alloy elements. Such a flux is not considered in Patent Literature 1 and Patent Literature 2.

The present invention has been made in view of the above circumstances, and an object of the present invention is to provide a flux for electroslag welding and an electroslag welding method, by which a weld metal is obtained that is stable in welding and excellent in weldability even when a welding wire or base metal contains various alloy elements, has good slag detachability even when the welding wire or base metal has a high tensile strength of, for example, 680 MPa or more, particularly 780 MPa or more when containing a large amount of alloy elements, has an excellent appearance without undercut, seizure, and the like.

Solution to Problem

As a result of intensive studies to solve the above problems, the present inventors have found that it is effective to contain $CaF_2$ as a fluoride, CaO as a basic oxide, and $SiO_2$ as an acidic oxide in a flux in order to maintain physical properties of a slag bath. That is, by appropriately specifying the contents of compounds in the flux, a slag bath having appropriate electrical conductivity and viscosity can be obtained, and the physical properties of the slag bath can be maintained even when other components are contained from a wire or base metal. The present invention has been made based on such findings.

The above object of the present invention is achieved by the following configuration [1] related to a flux for electroslag welding.

[1] A flux for electroslag welding used for electroslag welding, comprising a basic oxide, an amphoteric oxide, an acidic oxide, and a fluoride, wherein the basic oxide includes CaO: 5.1 mass % or more and 30.0 mass % or less with respect to a total mass of the flux, and a content of the CaO is 30 mass % or more with respect to a total mass of the basic oxide, the acidic oxide includes $SiO_2$: 17 mass % or less with respect to the total mass of the flux, and a content of the $SiO_2$ is 80 mass % or more with respect to a total mass of the acidic oxide, the fluoride includes $CaF_2$: 35 mass % or more and 73 mass % or less with respect to the total mass of the flux, and a content of the $CaF_2$ is 80 mass % or more with respect to a total mass of the fluoride, and a value calculated by the following relation (1) is 5 or more and 56 or less:

$$(2 \times [CaF_2] + [CaO])/[SiO_2] \qquad (1)$$

wherein, by mass % with respect to the total mass of the flux, [CaO] is the content of the CaO, $[SiO_2]$ is the content of the $SiO_2$, and $[CaF_2]$ is the content of the $CaF_2$.

The preferable embodiments relating to the flux for electroslag welding in the present invention are the following [2] to [7].

[2] The flux for electroslag welding according to [1], comprising, with respect to the total mass of the flux, the basic oxide: 10 mass % or more and 40 mass % or less, the amphoteric oxide: 5 mass % or more and 35 mass % or less, the acidic oxide: 17 mass % or less, wherein a total content of all oxides being a total of the basic oxide, the amphoteric oxide, and the acidic oxide is 28 mass % or more and 60 mass % or less, and a value calculated by the following relation (2) is 0.5 or more and 2.7 or less:

$$[Fld]/[Ox] \qquad (2)$$

wherein, by mass % with respect to the total mass of the flux, [Fld] is a total content of the fluoride and [Ox] is the total content of the all oxide.

[3] The flux for electroslag welding according to [1] or [2], wherein the basic oxide includes, with respect to the total mass of the flux, at least one selected from BaO: 11 mass % or less, FeO: 5 mass % or less, MgO: 5 mass % or less, a total content of either one or both of MnO and $MnO_2$ (MnO conversion value): 5 mass % or less, $K_2O$: 5 mass % or less, $Na_2O$: 5 mass % or less, and $Li_2O$: 5 mass % or less, and the amphoteric oxide includes, with respect to the total mass of the flux, at least one selected from $Al_2O_3$: 35 mass % or less, $ZrO_2$: 5 mass % or less, and $TiO_2$: 5 mass % or less.

[4] The flux for electroslag welding according to [3], wherein a value calculated by the following relation (3) is 0.35 or less:

$$([CaO]+[BaO])/([CaF_2]+[Al_2O_3]) \qquad (3)$$

wherein, by mass % with respect to the total mass of the flux, [CaO] is the content of the CaO, [BaO] is the content of the BaO, $[CaF_2]$ is the content of the $CaF_2$, and $[Al_2O_3]$ is the content of the $Al_2O_3$.

[5] The flux for electroslag welding according to [3] or [4], wherein a value calculated by the following relation (4) is 0.38 or more:

$$([CaO]+[Al_2O_3]+[BaO])/[CaF_2] \qquad (4)$$

wherein, by mass % with respect to the total mass of the flux, [CaO] is the content of the CaO, [BaO] is the content of the BaO, $[CaF_2]$ is the content of the $CaF_2$, and $[Al_2O_3]$ is the content of the $Al_2O_3$.

[6] The flux for electroslag welding according to any one of [1] to [5], wherein the acidic oxide includes, with respect to the total mass of the flux, at least one selected from $MoO_3$: 5 mass % or less, $V_2O_5$: 5 mass % or less, and $P_2O_5$: 5 mass % or less.

[7] The flux for electroslag welding according to any one of [1] to [6], wherein the amphoteric oxide includes, with respect to the total mass of the flux, $B_2O_3$: 2 mass % or less (including 0 mass %).

The above object is achieved by the constitution of the following [8] relating to the electroslag welding method

[8] An electroslag welding method comprising welding using a welding wire and the flux for electroslag welding according to any one of [1] to [7].

Advantageous Effects of Invention

According to the present invention, it is possible to provide a flux for electroslag welding and an electroslag welding method, by which a weld metal is obtained that is stable in welding and excellent in weldability even when a welding wire or base metal contains various alloy elements, has good slag detachability even when the welding wire or base metal has a high tensile strength of, for example, 680 MPa or more, particularly 780 MPa or more when containing a large amount of alloy elements, and has an excellent appearance, free from undercut, seizure, and the like.

BRIEF DESCRIPTION OF DRAWINGS

FIGURE a schematic view showing an electroslag welding device that can be used in an electroslag welding method according to the present invention.

DESCRIPTION OF EMBODIMENTS

Hereinafter, the present invention will be described in detail with reference to embodiments. In the present specification, "-" denotes a range of not less than a lower limit value and not more than an upper limit value. In the present specification, a flux for electroslag welding may be simply referred to as a flux, and an electroslag welding method according to the present invention may be simply referred to as a method of the present invention.

[1. Flux for Electroslag Welding]

The flux for electroslag welding according to the present invention contains a basic oxide, an amphoteric oxide, an acidic oxide, and a fluoride. The physical properties of a slag bath can be controlled by these oxides and the fluoride. Specifically, even when various alloy elements are added to the slag bath from a welding wire and a base metal during welding, physical properties of the slag bath can be maintained so that welding defects can be prevented, slag detachability is good, and seizure is not caused.

In general, the fluoride and the basic oxide become cations having high mobility, and the number of anions is reduced. Therefore, the electrical conductivity of the slag bath increases and the viscosity tends to decrease, as the content of the contained basic oxide increases.

On the other hand, since the acidic oxide becomes anions having low mobility, the electrical conductivity of the slag bath tends to decrease and the viscosity tends to increase, as the content of the basic oxide increases.

The action of the amphoteric oxide varies depending on a composition thereof. For example, $Al_2O_3$ acts in the same manner as the acidic oxide.

The electrical conductivity and the viscosity of the slag bath, which change depending on the contents of the oxides and the fluoride in the flux, affect the behavior of the slag bath. Specifically, it is considered that as the viscosity of the slag bath decreases and the electrical conductivity increases, a convection related to an electromagnetic force increases, and thus the slag bath is likely to flow, and the occurrence of undercut and overlap can be prevented. That is, it is considered that as the contents of the fluoride and the basic oxide in the flux increase, the occurrence of undercut and overlap can be prevented.

However, when the contents of the fluoride and the basic oxide in the flux increase, an arc is likely to be generated on the surface of the slag bath, and the welding itself becomes unstable (hereinafter, also referred to as welding unstable). This is because the resistance heat of the slag bath decreases due to an increase in the electrical conductivity, and the wire does not melt in the slag bath. As a result, the wire is short-circuited with a molten metal portion and fused on the surface of the slag bath, thereby generating an arc.

In order to prevent the welding unstable due to the generation of the arc, it is necessary to melt the wire in the slag bath. As a solution, there is a method of further deepening the slag bath.

However, when the slag bath becomes excessively deep, a penetration width decreases, and slag bites into a bead, so that welding defects such as undercut occur. Therefore, a flux, in which the electrical conductivity is controlled so as not to be excessively increased in a state where the viscosity of the entire slag bath is maintained low and the physical properties of the slag bath can be maintained even when other components are contained in the slag bath from the wire or the base metal, is required.

In the present invention, $CaF_2$ as a fluoride, CaO as a basic oxide, and $SiO_2$ as an acidic oxide are contained in the flux, whereby a slag bath having appropriate electrical conductivity and viscosity is obtained. That is, by appropriately specifying the contents of the compounds in the flux and parameters obtained from the content, the physical properties of the slag bath can be maintained even when other components are added from the wire or the base metal. Hereinafter, the content of each component contained in the flux for electroslag welding according to the present invention will be described together with the reason for limitation.

<CaO: 5.1 Mass % or More and 30.0 Mass % or Less with Respect to Total Mass of Flux>

CaO is a basic oxide and is a component to appropriately secure the viscosity of the molten slag and improve a shape of a weld bead, and has an effect of reducing the content of oxygen of the weld metal. When the content of CaO is less than 5.1 mass % with respect to the total mass of the flux, stirring of the slag bath becomes small because the viscosity becomes high, and a bead appearance deteriorates. On the other hand, when the content of CaO exceeds 30.0 mass % with respect to the total mass of the flux, the viscosity of the molten slag becomes excessively low, and thus the bead appearance deteriorates. Therefore, the content of CaO contained as the basic oxide in the flux is 5.1 mass % or more, preferably 9.0 mass % or more, and 30.0 mass % or less, preferably 20.0 mass % or less with respect to the total mass of the flux.

<CaO: 30 Mass % or More with Respect to Total Mass of Basic Oxide>

When a proportion of CaO to the total mass of the basic oxide is 30 mass % or more, CaO acts as one of dominant factors for controlling physical properties such as viscosity and electrical conductivity of the slag bath. When the proportion of CaO to the total mass of the basic oxide is less than 30 mass %, there is a high possibility that the components added to the slag bath from the welding wire and the base metal affect the physical properties of the slag bath. Therefore, in order to maintain the physical properties of the molten slag in an appropriate range, the proportion of CaO to the total mass of the basic oxide is 30 mass % or more, and preferably 50 mass % or more.

<$SiO_2$: 17 Mass % or Less (not Including 0 Mass %) with Respect to Total Mass of Flux>

$SiO_2$ is an acidic oxide and is a component having an effect of increasing the viscosity of the molten slag and decreasing the electrical conductivity. Thus, $SiO_2$ is used for controlling the physical properties of the molten slag in the present invention. When the content of $SiO_2$ exceeds 17 mass % with respect to the total mass of the flux, the viscosity of the molten slag becomes excessively high and the electrical conductivity becomes small, so that the stirring of the slag bath becomes small and the bead appearance deteriorates. As described above, the effect of adjusting the physical properties of the molten slag can be obtained when $SiO_2$ is contained even in a small amount. Therefore, the content of $SiO_2$ contained as the acidic oxide in the flux is 17 mass % or less, preferably 16 mass % or less, and more preferably 15 mass % or less, and preferably 1 mass % or more, and more preferably 2 mass % or more with respect to the total mass of the flux.

<$SiO_2$: 80 Mass % or More with Respect to Total Mass of Acidic Oxide>

When a proportion of $SiO_2$ to the total mass of the acidic oxide is 80 mass % or more, $SiO_2$ acts as one of the dominant factors for controlling the physical properties such as viscosity and electrical conductivity of the slag bath. When the proportion of $SiO_2$ to the total mass of the acidic oxide is less than 80 mass %, there is a high possibility that the components added to the slag bath from the welding wire and the base metal affect the physical properties of the slag bath. Therefore, in order to maintain the physical properties of the molten slag in an appropriate range, the proportion of $SiO_2$ to the total mass of the acidic oxide is 80 mass % or more, and preferably 85 mass % or more.

<$CaF_2$: 35 Mass % or More and 73 Mass % or Less with Respect to Total Mass of Flux>

$CaF_2$ contained in the flux as the fluoride is a component that appropriately secures the electrical conductivity of the molten slag, improves the stability of welding, appropriately secures the viscosity of the molten slag, and improves the shape of the weld bead. $CaF_2$ is also a component having an effect of reducing the content of oxygen in the weld metal. When the content of $CaF_2$ is less than 35 mass % with respect to the total mass of the flux, the viscosity of the molten slag increases and the electrical conductivity decreases, so that the stirring of the slag bath becomes small and the bead appearance deteriorates.

On the other hand, when the content of $CaF_2$ exceeds 73 mass % with respect to the total mass of the flux, the viscosity of the molten slag becomes excessively low, and thus the bead appearance deteriorates. The amount of a fluorine gas to be generated increases, and an indentation (pockmark) is generated in the weld bead, and further the bead appearance may deteriorate. In addition, since the electrical conductivity becomes excessively high, the resistance heat generation becomes insufficient, so that an arc is frequently generated during the welding, and the welding becomes unstable. Therefore, the content of $CaF_2$ contained as the fluoride in the flux is 35 mass % or more, preferably 45 mass % or more, and 73 mass % or less, preferably 69 mass % or less with respect to the total mass of the flux.

<$CaF_2$: 80 Mass % or More with Respect to Total Mass of Fluoride>

When a proportion of $CaF_2$ to the total mass of the fluoride is 80 mass % or more, $CaF_2$ acts as one of the dominant factors for controlling the physical properties such as viscosity and electrical conductivity of the slag bath. When the proportion of $CaF_2$ to the total mass of the fluoride is less than 80 mass %, there is a high possibility that the components added to the slag bath from the welding wire and the base metal affect the physical properties of the slag bath. Therefore, in order to maintain the physical properties of the molten slag in an appropriate range, the proportion of $CaF_2$ to the total mass of the fluoride is 80 mass % or more, and preferably 85 mass % or more.

Among fluorides contained in the flux, the balance excluding $CaF_2$ may contain $BaF_2$, NaF, LiF, KF, $MgF_2$, or the like in an amount of less than 20 mass % with respect to the total mass of the fluoride. $CaF_2$ is preferably 100 mass % with respect to the total mass of the fluoride.

<($2\times[CaF_2]+[CaO]/[SiO_2]$): 5 or More and 56 or Less>

As a factor that governs the physical properties such as viscosity and electrical conductivity of the molten slag, binding strength between a metal cation and an oxygen ion is exemplified. Among basic oxides, CaO has a small binding force, and thus is relatively easily ionized into $Ca^{2+}$ and anion $O^{2-}$. On the other hand, $SiO_2$ has a strong binding force among neutral oxides and acidic oxides, and forms giant anions in various forms by taking ionized $O^{2-}$. Examples of the giant anions in various forms include $Si_9O_{21}^{6-}$ and $Si_6O_{15}^{6-}$. Therefore, the combination of CaO and $SiO_2$ having different bonding forces is a dominant factor that affects the physical properties of the slag bath.

Furthermore, $CaF_2$ is considered to have an effect of decreasing the viscosity about twice that of CaO when combined with an oxide-based slag containing $SiO_2$. This is because CaO cuts only one Si—O bond, whereas $CaF_2$ cuts two Si—O bonds. Therefore, in the present invention, CaO, $SiO_2$, and $CaF_2$, which are components particularly affecting the physical properties of the slag bath, are dominant factors of the physical property control.

As described above, as the content of $CaF_2$ in the flux increases, the viscosity of the molten slag decreases, and the effect of increasing the electrical conductivity increases. On the other hand, it is known that, when CaO is contained in the flux, the viscosity of the molten slag decreases as per the trend of basic oxides, but with respect to the electrical conductivity, the electrical conductivity slightly decreases as the content of CaO increases in sodium silicate (FIG. 5 in "Journal of the Japan Welding Society, Vol. 36 (1967), No. 6, p. 608—regarding physical properties of molten slag"). That is, in a system of the molten slag in which $SiO_2$ is present, as the content of $CaF_2$ increases, the viscosity of the molten slag significantly decreases and the electrical conductivity increases, but as the content of CaO increases, the viscosity of the molten slag decreases and the electrical conductivity decreases, and this is a special trend.

In the present invention, a parameter represented by the following relation (1) is created using the contents of $CaF_2$, CaO, and $SiO_2$. When a value calculated by the following relation (1) satisfies a predetermined range, the electrical conductivity can be controlled so as not to be excessively increased while maintaining the viscosity of the slag bath low.

Specifically, when the value calculated by the following relation (1) is less than 5, where the content of CaO is represented by [CaO], the content of $SiO_2$ is represented by [$SiO_2$], and the content of $CaF_2$ is represented by [$CaF_2$], by mass % with respect to the total mass of the flux, the viscosity of the slag bath increases and the electrical conductivity decreases, so that the stirring of the slag bath becomes small and the bead appearance deteriorates.

On the other hand, when the value calculated by the following relation (1) exceeds 56, the viscosity of the molten slag becomes excessively low, and thus the bead appearance deteriorates. Since the electrical conductivity becomes excessively high and the resistance heat generation becomes insufficient, an arc is frequently generated during the welding, and welding becomes unstable. Therefore, when the value calculated by the following relation (1) is 5 or more, preferably 7 or more, and 56 or less, preferably 54 or less, more balanced viscosity and electrical conductivity can be maintained as the physical properties of the slag bath.

$$(2\times[CaF_2]+[CaO])/[SiO_2] \qquad (1)$$

<Fluoride: 35-73 Mass % with Respect to Total Mass of Flux>

In the present embodiment, as described above, $BaF_2$, NaF, LiF, KF, $MgF_2$, or the like can be contained as the fluoride in the flux in addition to $CaF_2$. The fluoride tends to decrease the viscosity of the slag bath and increase the electrical conductivity. In order to balance the viscosity and the electrical conductivity of the slag bath, the total content of the fluoride in the flux is preferably adjusted. The fluoride is preferably contained in an amount of 35 mass % to 73 mass % with respect to the total mass of the flux. When the content of the fluoride is 35 mass % or more, the effect of decreasing the viscosity of the slag bath and the electrical conductivity can be maintained. When the content of the fluoride is 73 mass % or less, an excessive decrease in viscosity and an increase in the electrical conductivity can be prevented.

[(a) Basic Oxide: 10 Mass % or More and 40 Mass % or Less with Respect to Total Mass of Flux]

When the content of the basic oxide in the flux increases, similarly to the case of $CaF_2$ (fluoride), the viscosity of the slag bath tends to decrease and the electrical conductivity tends to increase. When the content of the basic oxide in the flux is 10 mass % or more with respect to the total mass of the flux, the effect of decreasing the viscosity of the slag bath and increasing the electrical conductivity can be maintained. On the other hand, when the content of the basic oxide in the flux is 40 mass % or less with respect to the total mass of the flux, an excessive decrease in the viscosity or an increase in the electrical conductivity can be prevented. Therefore, in order to balance the viscosity and the electrical conductivity of the slag bath, the content of the basic oxide is preferably 10 mass % or more, and more preferably 11 mass % or more, and is preferably 40 mass % or less, and more preferably 39 mass % or less with respect to the total mass of the flux.

The flux in the present invention may optionally contain various compounds as the basic oxide from the viewpoint of adjusting the physical properties, mechanical performance, and the like of the molten slag.

It is preferably that at least one selected from BaO, FeO, MgO, MnO, $K_2O$, $Na_2O$, and $Li_2O$ is contained as the basic oxide in the flux in a range shown below.

Hereinafter, the limited ranges and effects of the respective components will be described.

<BaO: 11 Mass % or Less (Including 0 Mass %) with Respect to Total Mass of Flux)>

BaO is a basic oxide which affects the viscosity and the melting point of the molten slag, and has a high effect of reducing the content of oxygen of the weld metal. It is noted that, in the present invention, BaO may be optionally added to the flux in order to adjust the physical properties such as viscosity and melting point of the molten slag, mechanical performance, and the like, and the lower limit thereof is not specified. In the case where BaO is added, when the content of BaO is 11 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when BaO is added, the content of BaO is preferably 11 mass % or less, and more preferably 10 mass % or less with respect to the total mass of the flux.

<FeO: 5 Mass % or Less (Including 0 Mass %)>

FeO is a basic oxide which affects the viscosity and the melting point of the molten slag, and has a high effect of reducing the content of oxygen of the weld metal. It is noted that, in the present invention, FeO may be optionally added to the flux in order to adjust the physical properties such as viscosity and melting point of the molten slag, mechanical performance, and the like, and the lower limit thereof is not specified. In the case where FeO is added, when the content of FeO is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when FeO is added, the content of FeO is preferably 5 mass % or less, and more preferably 3 mass % or less with respect to the total mass of the flux.

<MgO: 5 Mass % or Less (Including 0 Mass %)>

MgO is a basic oxide which affects the viscosity and the melting point of the molten slag. It is noted that, in the present invention, MgO may be optionally added to the flux in order to adjust the viscosity and the melting point of the molten slag, and the lower limit thereof is not specified. In the case where MgO is added, when the content of MgO is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when MgO is added, the content of MgO is preferably 5 mass % or less, and more preferably 3 mass % or less with respect to the total mass of the flux.

<Total Content (MnO Conversion Value) of Either One or Both of MnO and $MnO_2$: 5 Mass % or Less (Including 0 Mass %)

MnO and $MnO_2$ are basic oxides which affect the viscosity and melting point of the molten slag. It is noted that, in the present invention, either one or both of MnO and $MnO_2$ may be optionally added to the flux in order to adjust the viscosity and the melting point of the molten slag, and the lower limit thereof is not specified. In the case where either one or both of MnO and $MnO_2$ are added, when the total content (MnO conversion value) of MnO and $MnO_2$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when either one or both of MnO and $MnO_2$ are added, the total content (MnO conversion value) of MnO and $MnO_2$ is preferably 5 mass % or less, and more preferably 3 mass % or less with respect to the total mass of the flux. The MnO conversion value is a value obtained by converting the total content of Mn in the flux into MnO.

<$K_2O$: 5 Mass % or Less (Including 0 Mass %)>

$K_2O$ is a basic oxide which affects the viscosity of the molten slag. In the present invention, $K_2O$ may be optionally added to the flux in order to adjust the viscosity of the molten slag, and the lower limit thereof is not specified. In the case where $K_2O$ is added, when the content of $K_2O$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $K_2O$ is added, the content of $K_2O$ is preferably 5 mass % or less, and more preferably 4 mass % or less with respect to the total mass of the flux.

<$Na_2O$: 5 Mass % or Less (Including 0 Mass %)>

$Na_2O$ is a basic oxide which affects the viscosity of the molten slag. In the present invention, $Na_2O$ may be optionally added to the flux in order to adjust the viscosity of the molten slag, and the lower limit thereof is not specified. In the case where $Na_2O$ is added, when the content of $Na_2O$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $Na_2O$ is added, the content of $Na_2O$ is preferably 5 mass % or less, and more preferably 4 mass % or less, with respect to the total mass of the flux.

<$Li_2O$: 5 Mass % or Less (Including 0 Mass %)>

$Li_2O$ is a basic oxide which affects the viscosity of the molten slag. In the present invention, $Li_2O$ may be optionally added to the flux in order to adjust the viscosity of the molten slag, and the lower limit thereof is not specified. In the case where $Li_2O$ is added, when the content of $Li_2O$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $Li_2O$ is added, the content of $Li_2O$ is preferably 5 mass % or less, and more preferably 4 mass % or less with respect to the total mass of the flux.

[(b) Amphoteric Oxide: 5 Mass % or More and 35 Mass % or Less with Respect to Total Mass of Flux]

When the content of the amphoteric oxide in the flux is 5 mass % or more and 35 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, the content of the amphoteric oxide is preferably 5 mass % or more, and more preferably 6 mass % or more, and is preferably 35 mass % or less, and more preferably 34 mass % or less with respect to the total mass of the flux.

The flux in the present invention may optionally contain various compounds as the amphoteric oxide from the viewpoint of adjusting the physical properties, mechanical performance, and the like of the molten slag.

It is preferable that at least one selected from $Al_2O_3$, $ZrO_2$, $TiO_2$ and $B_2O_3$ is contained as the amphoteric oxide in the flux in a range shown below.

Hereinafter, the limited ranges and effects of the respective components will be described.

<$Al_2O_3$: 35 Mass % or Less (Including 0 Mass %)>

$Al_2O_3$ is an amphoteric oxide which affects the viscosity and the melting point of the molten slag. In the present invention, $Al_2O_3$ may be optionally added to the flux in order to adjust the viscosity and the melting point of the molten slag, and the lower limit thereof is not specified. It is noted that, $Al_2O_3$ has a smaller effect on the viscosity and electrical conductivity of the molten slag than that of $SiO_2$, and is a suitable oxide for fine-adjusting the physical properties of the slag. Therefore, the content of $Al_2O_3$ is preferably 5 mass % or more with respect to the total mass of the flux. On the other hand, in the case where $Al_2O_3$ is added, when the content of $Al_2O_3$ is 35 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $Al_2O_3$ is added, the content of $Al_2O_3$ is preferably 35 mass % or less, more preferably 34 mass % or less with respect to the total mass of the flux.

<$ZrO_2$: 5 Mass % or Less (Including 0 Mass %)>

$ZrO_2$ is an amphoteric oxide which affects the viscosity of the molten slag. In the present invention, $ZrO_2$ may be optionally added to the flux in order to adjust the viscosity of the molten slag, and the lower limit thereof is not specified. In the case where $ZrO_2$ is added, when the content of $ZrO_2$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $ZrO_2$ is added, the content of $ZrO_2$ is preferably 5 mass % or less, and more preferably 1 mass % or less with respect to the total mass of the flux.

12

<$TiO_2$: 5 Mass % or Less (Including 0 Mass %)>

$TiO_2$ is an amphoteric oxide which affects the viscosity of the molten slag. In the present invention, $TiO_2$ may be optionally added to the flux in order to adjust the viscosity of the molten slag, and the lower limit thereof is not specified. In the case where $TiO_2$ is added, when the content of $TiO_2$ is 5 mass % or less with respect to the total mass of the flux, welding defects can be prevented, and appropriate molten slag physical properties for obtaining an optimum bead appearance can be maintained even when various alloy elements from the welding wire and the base metal are added to the slag bath. Therefore, when $TiO_2$ is added, the content of $TiO_2$ is preferably 5 mass % or less, and more preferably 4 mass % or less with respect to the total mass of the flux.

<$B_2O_3$: 2 Mass % or Less (Including 0 Mass %)>

$B_2O_3$ is an amphoteric oxide and has a boiling point of 1680° C., which is extremely lower than that of other oxides. Therefore, even when the slag is in a molten state or a state in which the slag starts to be solidified (slag having a high solid phase ratio), $B_2O_3$ continues to evaporate, and the vapor thereof acts so as to prevent the contact between the slag and the metal interface, which is a preferable effect on the slag detachability. When the content of $B_2O_3$ is 2 mass % or less with respect to the total mass of the flux, the effect of improving the slag detachability can be obtained without the influence on the pore defects. Therefore, when $B_2O_3$ is added in order to obtain even more excellent slag detachability, the content of $B_2O_3$ is preferably 2 mass % or less, and more preferably 1.5 mass % or less with respect to the total mass of the flux. On the other hand, the content of $B_2O_3$ is more preferably 0.001 mass % or more, and still more preferably 0.002 mass % or more with respect to the total mass of the flux.

[(c) Acidic Oxide: 17 Mass % or Less with Respect to Total Mass of Flux]

When the content of the acidic oxide in the flux increases, similarly to the case of $CaF_2$ (fluoride), the viscosity of the slag bath tends to decrease and the electrical conductivity tends to increase. When the content of the acidic oxide in the flux is 17 mass % or less with respect to the total mass of the flux, an excessive increase in the viscosity and a decrease in the electrical conductivity can be prevented. Therefore, in order to balance the viscosity and the electrical conductivity of the slag bath, the content of the acidic oxide is preferably 1 mass % or more, and more preferably 2 mass % or more, and is preferably 17 mass % or less, more preferably 16 mass % or less, and still more preferably 15 mass % or less with respect to the total mass of the flux.

The flux in the present invention may optionally contain various compounds as the acidic oxide from the viewpoint of adjusting the physical properties, mechanical performance, and the like of the molten slag.

It is preferable that at least one selected from $MoO_3$, $V_2O_5$, and $P_2O_5$ is contained as the acid oxide in the flux in a range shown below.

Hereinafter, the limited ranges and effects of the respective components will be described.

<At Least One of $MoO_3$, $V_2O_5$, and $P_2O_5$: 5 Mass % or Less (Including 0 Mass %) of Total Mass of Flux, Respectively>

$MoO_3$, $V_2O_5$, and $P_2O_5$ are acidic oxides which affect the viscosity and the melting point of the molten slag, and have a high effect of reducing the content of oxygen of the weld metal. It is noted that, in the present invention, it is preferable that at least one of $MoO_3$, $V_2O_5$, and $P_2O_5$ is optionally contained in the flux in order to adjust the physical properties such as viscosity and melting point of the molten slag, mechanical performance, and the like, and the lower limit thereof is not specified. In the case where at least one of $MoO_3$, $V_2O_5$, and $P_2O_5$ is contained, when the content of each component is 5 mass % or less, preferably 4 mass % or less with respect to the total mass of the flux, welding defects can be prevented, and appropriate molten slag physical properties for obtaining an optimum bead appearance can be maintained even when various alloy elements from the welding wire and the base metal are added to the slag bath.

In the present invention, as described above, it is preferable to appropriately specify the contents of the basic oxide, the amphoteric oxide, and the acidic oxide in the flux, and appropriately specify the total content of all oxides being a total of the basic oxide, the amphoteric oxide, and the acidic oxide, and the ratio of the total content of the fluoride to the total content of all oxides.

Hereinafter, these limited ranges and effects will be described.

<Total Content of all Oxides: 28 Mass % or More and 60 Mass % or Less>

When the total content of all oxides being a total of the basic oxide, the amphoteric oxide, and the acidic oxide is less than 28 mass % with respect to the total mass of the flux, the viscosity of the molten slag becomes excessively low, and thus the bead appearance deteriorates. On the other hand, when the total content of all oxides exceeds 60 mass % with respect to the total mass of the flux, the electrical conductivity becomes small, so that the stirring of the slag bath becomes small, and the bead appearance deteriorates.

Therefore, the total content of all oxides being a total of the basic oxide, the amphoteric oxide, and the acidic oxide in the flux is preferably 28 mass % or more, and more preferably 30 mass % or more, and preferably 60 mass % or less, and more preferably 59 mass % or less, with respect to the total mass of the flux.

<[Fld]/[Ox]: 0.5 or More and 2.7 or Less>

The total content of the fluoride is represented by [Fld] and the total content of the all oxides is represented by [Ox] by mass % with respect to the total mass of the flux, and when a value calculated by the following relation (2) is less than 0.5, the electrical conductivity becomes small, so that the stirring of the slag bath becomes small, and the bead appearance may deteriorate.

On the other hand, when the value calculated by the following relation (2) exceeds 2.7, the viscosity of the molten slag becomes excessively low, and thus the bead appearance may deteriorate.

Therefore, the value calculated by the following relation (2) is preferably 0.5 or more, more preferably 0.55 or more, and preferably 2.7 or less, more preferably 2.6 or less.

$$[Fld]/[Ox] \qquad (2)$$

<(CaO)]+[BaO]/([CaF$_2$]+[Al$_2$O$_3$]): 0.35 or Less>

In general, when the hygroscopicity resistance of the flux is low, the content of hydrogen in the molten metal increases, and there is a concern about low-temperature cracking. The present inventors have found that a parameter created from the contents of CaO, BaO, $CaF_2$, and $Al_2O_3$ in the flux is an index for controlling the hygroscopicity resistance and the weldability of the flux. Specifically, the hygroscopicity resistance of the flux can be improved and the occurrence of low-temperature cracking can be prevented, by controlling a value calculated by the following (3) to be 0.35 or less, where the content of CaO is represented by [CaO], the content of BaO is represented by [BaO], the content of $CaF_2$ is represented by [CaF$_2$], and the content of $Al_2O_3$ is represented by [Al$_2$O$_3$], by mass % with respect to the total mass of the flux. Therefore, the value calculated by the following relation (3) is preferably 0.35 or less. In addition, from the viewpoint of further improving the hygroscopicity resistance of the flux, the value calculated by the following relation (3) is more preferably 0.32 or less.

$$([CaO]+[BaO])/([CaF_2]+[Al_2O_3]) \qquad (3)$$

<(CaO)]+[Al$_2$O$_3$]+[BaO]/[CaF$_2$]: 0.38 or More>

The present inventors have found that when the content of CaO and BaO in the flux is decreased and the content of $CaF_2$ is increased, an open arc is likely to occur. On the other hand, as a result of introducing the flux too much so as not to form an open arc, the convection of the molten slag may change, the bead width may not be obtained, and an undercut may occur on the front bead side.

Specifically, the problems described above do not occur, and excellent weldability can be obtained, by controlling a value calculated by the following (4) to be 0.38 or more, where the content of CaO is represented by [CaO], the content of BaO is represented by [BaO], the content of $CaF_2$ is represented by [CaF$_2$], and the content of $Al_2O_3$ is represented by [Al$_2$O$_3$], by mass % with respect to the total mass of the flux. Therefore, the value calculated by the following (4) is preferably 0.38 or more, and more preferably 0.40 or more.

$$([CaO]+[Al_2O_3]+[BaO])/[CaF_2] \qquad (4)$$

In the present invention, in addition to the above compounds, metal elements such as Fe, Ni, and Cr may be added to the flux in the form of a simple metal powder or an alloy powder thereof, as long as the effects of the present invention are not impaired. The range that does not interfere with the effect of the present invention is 5 mass % or less (including 0 mass %) with respect to the total mass of the flux. In addition, in the case of the form of the alloy powder, a conversion value of each metal element may be 5 mass % or less (including 0 mass %) with respect to the total mass of the flux.

Although the components of the flux have been described above, the flux of the present invention is preferably composed of essential compounds such as CaO, $SiO_2$, and $CaF_2$, other optional compounds (which may be 0 mass %), optional metals (which may be 0 mass %), and inevitable impurities. Examples of the inevitable impurities include PbO, $Bi_2O_3$, $Cr_2O_3$, $Nb_2O_5$, S, SnO, REM oxides, C (derived from a graphite electrode). In general, the total content of the inevitable impurities is preferably 1 mass % or less with respect to the total mass of the flux.

[Production of Flux]

Examples of the flux to which the present invention can be applied include molten flux and bonded (baked) flux. The molten flux is manufactured by melting and crushing various raw materials in an electric furnace or the like. On the other hand, the baked flux is manufactured as follows. That is, various raw materials are bound by a binder such as alkaline silicate, granulated, and then baked. Since the molten flux is often used in the electroslag welding, the molten flux is preferable.

[2. Electroslag Welding Method]

The present invention also relates to an electroslag welding method for welding using a welding wire and the flux for electroslag welding. An electroslag welding method using the flux for electroslag welding according to the present invention will be described below. The present invention is not limited to the embodiment described below. As the electroslag welding method according to the present invention, for example, an electroslag welding method and an electroslag welding device described in JP-A-2016-215214 are preferably used.

FIG. 1s a schematic view showing the electroslag welding device that can be used in the electroslag welding method according to the present invention. As shown in FIGURE, an electroslag welding device 100 includes a welding torch 4 having a contact tip 5 that supplies power to a welding wire 6, a sliding copper backing plate 2, a travel carriage 16 on which the welding torch 4 and the sliding copper backing plate 2 are mounted, a molten slag bath detector 13, a flux supply device 14, a flux supply control device 15, and a travel carriage control device 17. The flux supply control device 15 controls the supply of the flux so that a length of the welding wire 6 from a tip of the contact tip 5 to a molten slag bath 7 becomes a predetermined length. The travel carriage control device 17 controls a traveling speed of the travel carriage 16 so that a welding current 8 has a predetermined relationship with a reference current value.

In the welding device configured as described above, a fixed copper backing plate 1 is disposed on the back side of a groove, and a sliding copper backing plate 2 is disposed on the front side of the groove. The welding torch 4 supplies power to the welding wire 6 by the welding current 8 supplied from a welding power source (not shown), and the welding of a welding base metal 3 is performed while maintaining a slag bath depth Ls at a predetermined depth.

When the welding device is used, in the electroslag welding using a sliding metal patch, welding is performed while maintaining the slag bath depth at a predetermined depth, thereby ensuring good penetration and preventing deterioration of the mechanical performance of the weld metal.

In the electroslag welding method according to the present invention, it is preferable to adopt the following conditions.

[Welding Conditions]
<Welding Wire>

The form of the welding wire used in the method of the present invention is not particularly limited. The welding wire may be a solid wire or a flux-cored wire.

The solid wire is a wire-shaped wire having a wire cross-section that is solid and is homogeneous. The surface of the solid wire may or may not be plated with copper, but either form is acceptable.

The flux-cored wire includes a cylindrical sheath and a flux filled inside the sheath. The flux-cored wire may be of either a seamless type having no seam in the sheath or a seam type having a seam in the sheath. The wire surface (outside of the sheath) of the flux-cored welding wire may or may not be plated with copper. A material of the sheath is not particularly limited, may be a soft steel or stainless steel, as long as a composition with respect to the total mass of the welding wire is a target composition.

(Diameter of Welding Wire: 1.1 mm to 2.0 mm)

In the method of the present invention, when a diameter (wire diameter) of the welding wire to be used is 1.1 mm or more, a high welding current can flow, which contributes to stirring of the slag bath to prevent welding defects. On the other hand, when the diameter of the wire is 2.0 mm or less, the wire is easily melted, and thus weldability is improved. Therefore, the diameter of the welding wire is preferably 1.1 mm to 2.0 mm.

<Welding Current: 200 A to 500 A>

When the welding current is appropriately adjusted, appropriate slag heat generation can be obtained, and appropriate penetration can be obtained over an entire weld length. When the welding current is 200 A or more, sufficient slag heat generation can be obtained, and good penetration can be obtained. On the other hand, when the welding current is 500 A or less, the melting of the wire becomes stable, the welding does not become unstable as in the case of arc generation or the like, and good weldability can be obtained. Therefore, the welding current is preferably 200 A to 500 A.

<Welding Voltage: 25 V to 58 V>

The welding voltage has a large effect on the size of the penetration and a protruding length of the wire. When the welding voltage is 25 V or more, sufficient penetration is obtained. On the other hand, when the welding voltage is 58 V or less, an appropriate protruding length can be maintained, and deterioration of weldability due to generation of an arc or the like can be prevented. Therefore, the welding voltage is preferably set to 25 V to 58 V.

<Wire Feeding Speed: 6.5 m/Min to 25.0 m/Min>

In a non-consumable nozzle type electroslag welding, a wire feeding speed can be set in a large range. When the wire feeding speed is 6.5 m/min or more, welding can be economically performed with high welding efficiency, and deterioration in toughness of a welded portion due to an increase in welding heat input can be prevented. Since it is possible to maintain an appropriate protruding length, it is possible to prevent an are from being generated due to a change in the feeding speed of the wire, and it is possible to prevent the welding from being stopped and the toughness from deteriorating. On the other hand, when the wire feeding speed is 25.0 m/min or less, the occurrence of insufficient penetration due to a decrease in welding heat input can be prevented. Since an appropriate protruding length can be maintained, deterioration of weldability due to generation of an arc or the like and deterioration of toughness of the weld metal can be prevented. Therefore, the wire feeding speed is preferably 6.5 m/min to 25.0 m/min.

<Slag Bath Depth: 10 mm to 35 mm>

In the electroslag welding method according to the present invention, it is important to efficiently obtain heat generation of the slag in order to obtain good penetration. When the slag bath depth is 10 mm or more, appropriate heat generation of the slag can be obtained, and the wire is stably melted in the slag. Therefore, there is no possibility of arc stop or the like. On the other hand, when the slag bath depth is 35 mm or less, a good temperature of the slag can be maintained, and melting of the wire and melting of the base metal are stabilized. Therefore, no arc is generated on the surface of the slag bath, and it is possible to prevent welding stop and insufficient penetration. Therefore, the slag bath depth is preferably 10 mm to 35 mm.

Example

Hereinafter, the present invention will be described in more detail with reference to Examples. The present invention is not limited to these Examples, and can be carried out by making modifications within a range compatible with the gist of the present invention, and all of them are included in the technical scope of the present invention.

Fluxes for electroslag welding having a composition shown in Tables 1 and 2 below were prepared, and the hygroscopicity of each flux was evaluated. Electroslag welding was performed under the following welding conditions using a welding wire having a composition shown in Table 3 below and the flux described above. A tensile strength of a weld metal, the weldability during the welding, and an appearance after the welding were evaluated by the following test methods and evaluation criteria.

Measurement results of the flux hygroscopicity, a steel type and a sheet thickness of a welding base metal, and the respective evaluation results are shown in Table 4 below. Note that 490 A in the steel type of the welding base metal represents a symbol described in a rolled steel material for a welded structure of JIS G 3106.

[Welding Conditions]

Wire diameter: 1.6 mm
Welding current: 380 A to 400 A
Welding voltage: 36 V to 40 V
Welding speed: 2.2 cm/min to 4.0 cm/min
Wire feeding speed: 10.1 m/min to 14.3 m/min
Slag bath depth: 15 mm to 20 mm

[Evaluation Method and Evaluation Criteria]

<Hygroscopicity of Flux>

Each flux was left in an environment at a temperature of 30° C. and a humidity of 80% for 168 hours, then air was used as an extraction gas, and a moisture content was measured by a Karl Fischer method at an extraction temperature of 750° C. to evaluate the hygroscopicity of the flux. Flux having a moisture content of 1500 ppm or less was evaluated as A (excellent), and flux having a moisture content of more than 1500 ppm was evaluated as B (good).

<Tensile Strength of Weld Metal>

A tensile test piece was taken from a central portion of a weld metal in parallel to a weld line direction in accordance with a tensile test method of a weld metal described in JIS Z3111, and the tensile strength was measured in accordance with a tensile test method of a metal material described in JIS Z2241.

<Weldability>

Weldability was evaluated by observing welding stability depending on the presence or absence of arc generation at the time of welding. As evaluation criteria, those in which no arc was generated and stable weldability was obtained were evaluated as A (excellent), those in which a small arc was generated and welding became unstable but the work was not affected were evaluated as B (good), and those in which an arc was frequently generated on the surface of a slag bath or the like and welding became unstable were evaluated as C (poor).

<Appearance>

An appearance of the weld metal after welding was evaluated by observing slag detachability, occurrence of seizure, and presence or absence of undercut. As the evaluation criteria, those having no problem in any of the items were evaluated as good, and those having a problem in any of the items were evaluated as poor.

TABLE 1

| | | | Flux component (mass % with respect to total mass of flux) | | | | | | | | | | | | | |
|---|---|---|---|---|---|---|---|---|---|---|---|---|---|---|---|---|
| | Flux | Fluoride | Basic oxide | | | | | | | Amphoteric oxide | | | Acidic oxide | Others | |
| | No. | $CaF_2$ | CaO | BaO | FeO | MgO | $MnO, MnO_2$ | $Na_2O$ | $K_2O$ | $Al_2O_3$ | $B_2O_3$ | $ZrO_2$ | $SiO_2$ | P | S |
| Example | 1 | 56.4 | 13.3 | 4.0 | 0.3 | 0.7 | 0.3 | — | — | 21.1 | 0.038 | — | 2.8 | — | — |
| | 2 | 53.7 | 14.0 | 4.2 | 0.2 | 0.8 | 0.3 | — | — | 23 | 0.016 | — | 2.9 | — | — |
| | 3 | 52.7 | 10.2 | — | 0.15 | 0.44 | 0.6 | 0.15 | 0.10 | 20.6 | 0.027 | — | 14.3 | 0.008 | 0.007 |
| | 4 | 61.9 | 14.4 | 4.6 | 0.1 | 0.1 | — | — | — | 13.6 | 1.23 | — | 3.8 | — | 0.02 |
| | 5 | 58.0 | 13.7 | 4.1 | — | — | — | — | — | 21.4 | 0.092 | — | 2.4 | — | — |
| | 6 | 53.2 | 14.1 | 3.9 | 0.4 | 0.4 | — | — | — | 15.1 | 0.0062 | — | 11.5 | — | — |
| | 7 | 54.3 | 13.6 | 8.5 | 0.2 | 3.5 | 0.3 | — | — | 15.8 | 0.35 | 0.3 | 4 | — | — |
| | 8 | 65.7 | 15.0 | 4.3 | 0.1 | 0.2 | — | — | — | 7.3 | 1.26 | — | 6.0 | — | 0.02 |
| | 9 | 69.3 | 5.4 | 8.3 | — | 0.4 | — | — | — | 11.8 | 1.17 | — | 3.0 | — | 0.02 |
| | 10 | 50.0 | 17.4 | — | 0.1 | 0.9 | 0.4 | — | — | 26.9 | 0.019 | — | 2.6 | — | — |
| | 11 | 47.3 | 13.8 | 3.5 | 0.2 | 0.8 | 0.4 | — | — | 30.8 | 0.016 | — | 2.7 | — | 0.02 |
| | 12 | 37.7 | 28.1 | 8.7 | 0.2 | 0.5 | 0.2 | — | — | 18.3 | 0.072 | — | 2.8 | — | — |
| | 13 | 53.2 | 15.1 | 10.7 | — | 0.9 | 0.2 | — | — | 16.4 | 0.5 | 0.1 | 2.6 | — | 0.02 |
| Comparative | 14 | 75.3 | 7.6 | 4.2 | 0.1 | — | — | — | — | 8.6 | 2.21 | — | 2.7 | — | 0.02 |
| Example | 15 | 73.7 | 8.8 | 4.9 | — | — | — | — | — | 8.9 | 1.57 | — | 2.7 | — | 0.01 |

*In the table, "—" represents that a content of a component is less than a detection limit.

TABLE 2

| | Flux No. | Flux component (mass % with respect to total mass of flux) | | | | | $CaF_2$ |
|---|---|---|---|---|---|---|---|
| | | Total amount of fluoride | Total amount of all oxides | Total amount of basic oxide | Total amount of amphoteric oxide | Total amount of acidic oxide | (mass %) with respect to total mass of fluoride |
| Example | 1 | 56.40 | 42.54 | 18.60 | 21.14 | 2.80 | 100 |
| | 2 | 53.70 | 45.42 | 19.50 | 23.02 | 2.90 | 100 |
| | 3 | 52.70 | 46.57 | 11.64 | 20.63 | 14.30 | 100 |
| | 4 | 61.87 | 37.83 | 19.20 | 14.83 | 3.80 | 100 |
| | 5 | 58.00 | 41.69 | 17.80 | 21.49 | 2.40 | 100 |
| | 6 | 53.20 | 45.41 | 18.80 | 15.11 | 11.50 | 100 |
| | 7 | 54.30 | 46.25 | 26.10 | 16.15 | 4.00 | 100 |
| | 8 | 65.74 | 34.16 | 19.60 | 8.56 | 6.00 | 100 |
| | 9 | 69.33 | 30.07 | 14.10 | 12.97 | 3.00 | 100 |
| | 10 | 50.00 | 48.32 | 18.80 | 26.92 | 2.60 | 100 |
| | 11 | 47.30 | 52.22 | 18.70 | 30.82 | 2.70 | 100 |

TABLE 2-continued

|  | | | | | | |  |
|---|---|---|---|---|---|---|---|
|  | 12 | 37.70 | 58.87 | 37.70 | 18.37 | 2.80 | 100 |
|  | 13 | 53.20 | 46.40 | 26.90 | 16.90 | 2.60 | 100 |
| Comparative | 14 | 75.29 | 25.41 | 11.90 | 10.81 | 2.70 | 100 |
| Example | 15 | 73.65 | 26.87 | 13.70 | 10.47 | 2.70 | 100 |

|  | Flux No. | CaO (mass %) with respect to total mass of basic oxide | $SiO_2$ (mass %) with respect to total mass of acidic oxide | Relation (1) | Relation (2) | Relation (3) | Relation (4) |
|---|---|---|---|---|---|---|---|
| Example | 1 | 71.51 | 100 | 45.04 | 1.33 | 0.22 | 0.68 |
|  | 2 | 71.79 | 100 | 41.86 | 1.18 | 0.24 | 0.77 |
|  | 3 | 87.63 | 100 | 8.08 | 1.13 | 0.14 | 0.58 |
|  | 4 | 75.00 | 100 | 36.35 | 1.64 | 0.25 | 0.53 |
|  | 5 | 76.97 | 100 | 54.04 | 1.39 | 0.22 | 0.68 |
|  | 6 | 75.00 | 100 | 10.48 | 1.17 | 0.26 | 0.62 |
|  | 7 | 52.11 | 100 | 30.55 | 1.17 | 0.32 | 0.70 |
|  | 8 | 76.53 | 100 | 24.41 | 1.92 | 0.26 | 0.40 |
|  | 9 | 38.30 | 100 | 48.02 | 2.31 | 0.17 | 0.37 |
|  | 10 | 92.55 | 100 | 45.15 | 1.03 | 0.23 | 0.89 |
|  | 11 | 73.80 | 100 | 40.15 | 0.91 | 0.22 | 1.02 |
|  | 12 | 74.54 | 100 | 36.96 | 0.64 | 0.66 | 1.46 |
|  | 13 | 56.13 | 100 | 46.73 | 1.15 | 0.37 | 0.79 |
| Comparative | 14 | 63.87 | 100 | 58.59 | 2.96 | 0.14 | 0.27 |
| Example | 15 | 64.23 | 100 | 57.81 | 2.74 | 0.17 | 0.31 |

Relation (1): (2 × [CaF$_2$] + [CaO])/[SiO$_2$], Relation (2): [Fld]/[Ox], Relation (3): ([CaO] + [BaO])/([CaF$_2$] + [Al$_2$O$_3$]),
Relation (4): (CaO] + [Al$_2$O$_3$] + [BaO])/[CaF$_2$]
It is noted that, [CaF$_2$], [CaO], [SiO$_2$], [BaO], [Al$_2$O$_3$], [Fld] and [Ox] represent contents (mass %) of CaF$_2$, CaO, SiO$_2$,
BaO, Al$_2$O$_3$, fluoride and all oxides, with respect to the total mass of flux, respectively.

TABLE 3

| Chemical composition of wire (mass % with respect to total mass of wire) | | | | | | | | | | | | | |
|---|---|---|---|---|---|---|---|---|---|---|---|---|---|
| C | Si | Mn | P | S | Ni | Mo | REM | Al | Ca | Mg | F | Ba | B |
| <0.05 | <0.25 | 0.1-0.6 | <0.01 | <0.01 | 8-13 | <1.0 | 0.01-0.80 | 0.01-0.15 | 0.001-0.15 | 0.001-0.1 | <0.50 | <1.0 | <0.01 |

*In the table, F is an F conversion value of fluorine or a fluorine compound excluding CaF$_2$.

TABLE 4

|  | Test No. | Flux No. | Hygroscopicity | | Welding base metal | | Welding evaluation | |
|---|---|---|---|---|---|---|---|---|
|  |  |  | Moisture content (ppm) | Evaluation type | Steel | Sheet thickness (mm) | Tensile strength (N/mm$^2$) | Weldability | Appearance |
| Example | 1 | 1 | 187 | A | SM490A | 30 | 836 | A | Good |
|  | 2 | 2 | 201 | A | SM490A | 30 | 918 | A | Good |
|  | 3 | 3 | 114 | A | 9% Ni steel | 30 | 817 | A | Good |
|  | 4 | 4 | 1090 | A | SM490A | 50 | 913 | A | Good |
|  | 5 | 5 | 187 | A | SM490A | 30 | 912 | A | Good |
|  | 6 | 6 | 111 | A | SM490A | 50 | 869 | A | Good |
|  | 7 | 7 | 678 | A | 9% Ni steel | 30 | 834 | A | Good |
|  | 8 | 8 | 621 | A | SM490A | 50 | 917 | A | Good |
|  | 9 | 9 | 144 | A | SM490A | 50 | 917 | B | Good |
|  | 10 | 10 | 257 | A | SM490A | 30 | 906 | A | Good |
|  | 11 | 11 | 251 | A | SM490A | 30 | 902 | A | Good |
|  | 12 | 12 | 2530 | B | SM490A | 50 | 879 | A | Good |
|  | 13 | 13 | 2960 | B | 9% Ni steel | 30 | 726 | A | Good |
| Comparative Example | 14 | 14 | 186 | A | SM490A | 50 | — | C | Poor |
|  | 15 | 15 | 333 | A | SM490A | 50 | 819 | C | Poor |

In the table, — represents measurement is not performed.

As shown in Tables 1 to 4, in Test Nos. 1 to 13 of Examples, the contents of CaO, SiO₂, and CaF₂ with respect to the total mass of the flux, the contents of CaO, SiO₂, and CaF₂ with respect to each the total mass of the basic oxide, the acid oxide and the fluoride were within the range of the present invention, and the value calculated by relation (1) was also within the range of the present invention. Therefore, it was possible to obtain a weld metal that is stable in welding, excellent in weldability, has a high tensile strength for example 680 MPa or more, and has excellent appearance such as undercut, slag detachability, and seizure, even when the welding wire or the base metal has various alloy elements.

In particular, in Test Nos. 1 to 11 which are Examples, the value calculated by relation (3) is within the preferable range of the present invention in the used flux. Therefore, the hygroscopicity of the flux was extremely low, and there was no concern about the occurrence of low-temperature cracking.

In Test Nos. 1 to 8 and 10 to 13 which are Examples, the value calculated by relation (4) is within the preferable range of the present invention in the used flux. Therefore, unstable welding due to the generation of an arc does not occur, and excellent weldability can be obtained.

On the other hand, in Test Nos. 14 and 15 which are Comparative Examples, the content of CaF₂ with respect to the total mass of the flux and the value calculated by relation (1) were out of the range of the present invention. Therefore, welding became unstable due to the generation of an arc, undercuts occurred, and the slag detachability decreased.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the present invention.

The present application is based on Japanese Patent Application No. 2020-038722 filed on Mar. 6, 2020, and the contents thereof are incorporated herein by reference.

REFERENCE SIGNS LIST

1 Copper backing plate
2 Sliding copper backing plate
3 Welding base metal
4 Welding torch
5 Contact tip
6 Welding wire
7 Molten slag bath
8 Welding current
13 Molten slag bath detector
14 Flux supply device
15 Flux supply control device
16 Travel carriage
17 Travel carriage control device
100 Electroslag welding device
The invention claimed is:

1. A flux suitable for electroslag welding used for electroslag welding, the flux comprising:
a basic oxide;
an amphoteric oxide;
an acidic oxide;
a fluoride; and at least one selected from the group consisting of BaO, FeO, MgO, MoO₃, V₂O₅, P₂O₅, ZrO₂, TiO₂, and B₂O₃,
wherein the basic oxide comprises CaO in a range of from 5.1 to 30.0 mass % with respect to a total flux mass, the CaO being present in 30 mass % or more with respect to a total basic oxide mass,
wherein the acidic oxide comprises SiO₂ in a range of 17 mass % or less with respect to the total flux mass, the SiO₂ being present in a range of 80 mass % or more with respect to a total acidic oxide mass,
wherein the fluoride comprises CaF₂ in a range of from 35 to 73 mass % with respect to the total flux mass, the CaF₂ being present in 80 mass % or more with respect to a total fluoride mass, and
wherein a value calculated by relation (1) is in a range of from 5 to 56:

$$(2\times[CaF_2]+[CaO])/[SiO_2] \tag{1},$$

wherein [CaO] is a content of the CaO, [SiO₂] is a content of the SiO₂, and [CaF₂] is a content of the CaF₂, each by mass % with respect to the total flux mass.

2. The flux of claim 1, comprising, with respect to the total flux mass:
the basic oxide in a range of from 10 to 40 mass %;
the amphoteric oxide in a range of from 5 to 35 mass %;
the acidic oxide in a range of 17 mass % or less,
wherein a total content of all oxides, being a total of the basic oxide, the amphoteric oxide, and the acidic oxide, is in a range of from 28 to 60 mass %, and
wherein a value calculated by relation (2) is in a range of from 0.5 to 2.7:

$$[Fld]/[Ox] \tag{2}$$

wherein [Fld] is a total content of the fluoride and [Ox] is a total content of the all oxide, each by mass % with respect to the total flux mass.

3. The flux of claim 2, wherein, with respect to the total flux mass, the basic oxide comprises:
BaO in a range of 11 mass % or less,
FeO in a range of 5 mass % or less,
MgO in a range of 5 mass % or less,
a total content of either one or both of MnO and MnO₂ (MnO conversion value) in a range of 5 mass % or less,
K₂O in a range of 5 mass % or less,
Na₂O in a range of 5 mass % or less, and/or
Li₂O in a range of 5 mass % or less, and
wherein, with respect to the total flux mass, the amphoteric oxide comprises
Al₂O₃ in a range of 35 mass % or less,
ZrO₂ in a range of 5 mass % or less, and/or
TiO₂ in a range of 5 mass % or less.

4. The flux of claim 3, wherein a value calculated by relation (3) is 0.35 or less:

$$([CaO]+[BaO])/([CaF_2]+[Al_2O_3]) \tag{3},$$

wherein [CaO] is a content of the CaO, [BaO] is a content of the BaO, [CaF₂] is a content of the CaF₂, and [Al₂O₃] is a content of the Al₂O₃, with respect to the total flux mass.

5. The flux of claim 4, wherein a value calculated by relation (4) is 0.38 or more:

$$([CaO]+[Al_2O_3]+[BaO])/[CaF_2] \tag{4},$$

wherein [CaO] is a content of the CaO, [BaO] is a content of the BaO, [CaF₂] is a content of the CaF₂, and [Al₂O₃] is a content of the Al₂O₃, with respect to the total flux mass.

6. The flux of claim 3, wherein a value calculated by relation (4) is 0.38 or more:

$$([CaO]+[Al_2O_3]+[BaO])/[CaF_2] \qquad (4),$$

wherein [CaO] is a content of the CaO, [BaO] is a content of the BaO, [CaF$_2$] is a content of the CaF$_2$, and [Al$_2$O$_3$] is a content of the Al$_2$O$_3$, with respect to the total flux mass.

7. The flux of claim 2, wherein, with respect to the total flux mass, the acidic oxide comprises:

MoO$_3$ in a range of 5 mass % or less,

V$_2$O$_5$ in a range of 5 mass % or less, and/or

P$_2$O$_5$ in a range of 5 mass % or less.

8. The flux of claim 2, wherein, with respect to the total flux mass, the amphoteric oxide comprises:

B$_2$O$_3$ in a range of 2 mass % or less (including 0 mass %).

9. An electroslag welding method, comprising:

welding using a welding wire and the flux of claim 2.

10. The flux of claim 1, wherein, with respect to the total flux mass, the basic oxide comprises:

BaO in a range of 11 mass % or less,

FeO in a range of 5 mass % or less,

MgO in a range of 5 mass % or less, a total content of either one or both of MnO and MnO$_2$ (MnO conversion value) in a range of 5 mass % or less, K$_2$O in a range of 5 mass % or less, Na$_2$O in a range of 5 mass % or less, and/or Li$_2$O in a range of 5 mass % or less, and wherein, with respect to the total flux mass, the amphoteric oxide comprises Al$_2$O$_3$ in a range of 35 mass % or less, ZrO$_2$ in a range of 5 mass % or less, and/or TiO$_2$ in a range of 5 mass % or less.

11. The flux of claim 10, wherein a value calculated by relation (3) is 0.35 or less:

$$([CaO]+[BaO])/([CaF_2]+[Al_2O_3]) \qquad (3),$$

wherein [CaO] is a content of the CaO, [BaO] is a content of the BaO, [CaF$_2$] is a content of the CaF$_2$, and [Al$_2$O$_3$] is a content of the Al$_2$O$_3$, with respect to the total flux mass.

12. The flux of claim 11, wherein a value calculated by relation (4) is 0.38 or more:

$$([CaO]+[Al_2O_3]+[BaO])/[CaF_2] \qquad (4),$$

wherein [CaO] is a content of the CaO, [BaO] is a content of the BaO, [CaF$_2$] is a content of the CaF$_2$, and [Al$_2$O$_3$] is a content of the Al$_2$O$_3$, with respect to the total flux mass.

13. The flux of claim 10, wherein a value calculated by relation (4) is 0.38 or more:

$$([CaO]+[Al_2O_3]+[BaO])/[CaF_2] \qquad (4)$$

wherein [CaO] is a content of the CaO, [BaO] is a content of the BaO, [CaF$_2$] is a content of the CaF$_2$, and [Al$_2$O$_3$] is a content of the Al$_2$O$_3$, with respect to the total flux mass.

14. The flux of claim 1, wherein, with respect to the total flux mass, the acidic oxide comprises:

MoO$_3$ in a range of 5 mass % or less,

V$_2$O$_5$ in a range of 5 mass % or less, and/or

P$_2$O$_5$ in a range of 5 mass % or less.

15. The flux of claim 1, wherein, with respect to the total flux mass, the amphoteric oxide comprises:

B$_2$O$_3$ in a range of 2 mass % or less (including 0 mass %).

16. An electroslag welding method, comprising:

welding using a welding wire and the flux of claim 1.

17. The flux of claim 1, wherein, with respect to the total flux mass, the basic oxide comprises BaO in a range of 11 mass % or less.

18. The flux of claim 1, wherein, with respect to the total flux mass, the basic oxide comprises FeO in a range of 5 mass % or less.

* * * * *